Jan. 20, 1942.   E. BRAZITIS ET AL   2,270,724
WELDING ELECTRODE HOLDER
Filed June 19, 1940
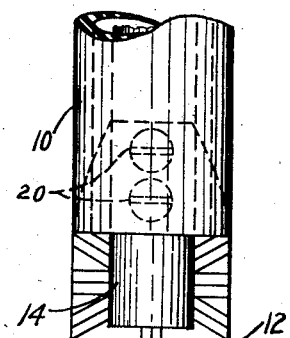
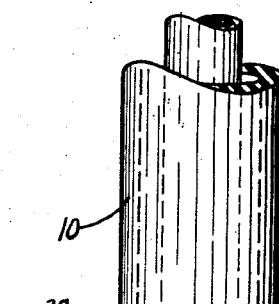
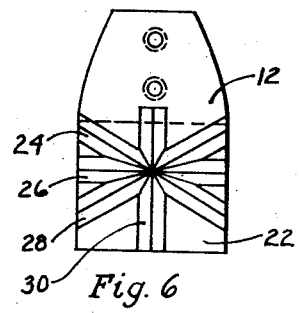
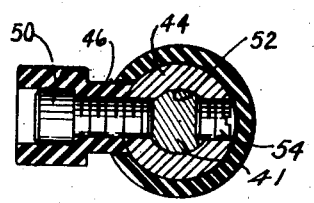
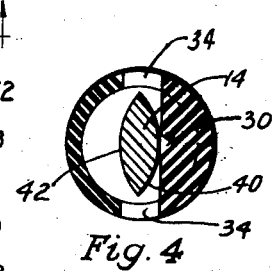
INVENTOR
EDWARD BRAZITIS
BY GEORGE BRAZITIS
ATTORNEY Patented Jan. 20, 1942

2,270,724

UNITED STATES PATENT OFFICE 2,270,724

WELDING ELECTRODE HOLDER

Edward Brazitis, St. Clair Shores, and George Brazitis, Detroit, Mich.

Application June 19, 1940, Serial No. 341,350

15 Claims. (Cl. 219—8)

This invention relates to welding electrode holders.

A principal object of this invention is to provide a new and improved welding electrode holder which is constructed and arranged in such a manner that the parts thereof are not subject to deterioration due to arcing or use to the extent to which the parts of welding electrode holders heretofore known are thereby affected.

Another object of the invention is to provide a novel and improved welding electrode holder which is more dependable in operation due to the simplicity of its design and the sturdiness of its construction than holders of the prior art.

Another object of the invention is to provide a novel and more useful construction of welding electrode holder embodying replaceable electrode retainer parts, at least one of which is designed and constructed so as to provide a plurality of working faces.

Another object of the invention is to provide a welding electrode holder having means whereby an electrode retainer of insulating material is utilized to project the electrode from the welding electrode holder at various angles, the electrode retainer of insulating material insuring safety to the operator since arcing is prevented in the event the electrode retainer contacts any outside grounded metal.

Other objects and advantages of the invention will be apparent from a consideration of the following specification taken in conjunction with the accompanying drawing of which there is one sheet and wherein:

Fig. 1 is a plan view of a part of a welding electrode holder embodying the invention;

Fig. 2 is a plan view illustrating a modified form of construction of a part of the holder illustrated in Fig. 1;

Fig. 3 is a side elevational view of the construction illustrated in Fig. 1, with parts broken away and other parts shown in section;

Fig. 4 is a vertical sectional view taken in a plane along the line 4—4 of Fig. 3, looking in the direction of the arrows;

Fig. 5 is a vertical sectional view taken in a plane along the line 5—5 of Fig. 3, looking in the direction of the arrows; and Fig. 6 is a plan view of the electrode retainer formed of insulating material and illustrating the various positions in which the electrode may be projected from the holder.

Referring now to Fig. 3 of the drawing, there is illustrated a welding electrode holder comprising a tubular housing 10 having an electrode retaining part or electrode retainer 12 associated therewith at one end thereof and a jaw or electrode retainer 14 arranged therein and adjacent the retainer 12. The housing 10 may consist of a length or section of tubing formed of a hard rubber, plastic, or some other suitable insulating material.

The electrode retainer 12 associated with the housing 10 preferably comprises a piece of insulating material such as hard rubber or plastic, which is shaped in such a way as to enable the same to be secured to one end of the tubular housing 10, preferably so that the exterior or outside surface of the retainer 12 will conform to the exterior surface of the housing 10 and form an integral projection thereof. The retainer 12, as illustrated in Fig. 3, may be formed to provide a shoulder 16 which will seat against one end of the housing 10 and to have an integral projection 18 which extends into the housing along the inner surface thereof. Screws 20 may be provided for removably securing the retainer 12 to the end of the housing 10. By making the retainer 12 removable, it will be possible to replace the same in the event of wear thereof. On the other hand, if desired, the retainer 12 may be formed integrally with the end of the housing 10.

The working face 22 of the retainer 12, as is best illustrated in Fig. 6, preferably is provided with a series of unaligned grooves 24, 26, 28 and 30. These grooves provide a means for holding the electrode in any one of a plurality of positions so that the electrode may project from the holder at various angles.

As illustrated in Fig. 3, the end of the housing 10 to which the retainer 12 is secured may be cut away so that the end of the retainer 12 may be flush with the end of the housing 10 or, as illustrated in Fig. 2, the end of the housing 10 may be shaped in such a way that the retainer 12, as well as the retainer 14, will project from the end thereof.

In the construction illustrated in Fig. 3, the part 32 of the housing 10 which overlies the retainer 12 will serve to prevent the accidental contact of the electrode 14 with the material being worked on, whereas in Fig. 2 the end of the retainer 14 being exposed may accidentally be brought into contact with a part of the material being worked on.

In the construction illustrated in Fig. 3, a slot 34 is formed between the retainer 12 and the end 32 of the housing, so as to permit the electrode to project from the holder therethrough, whereas in the construction illustrated in Fig. 2, since the retainers 12 and 14 project from the end of the housing 10, no such slot is required.

The electrode retainer 14 comprises a part of a jaw member indicated generally at 36 and which includes the retainer 14, arranged within the housing 10, and a handle 38 arranged externally of and alongside of the housing 10, the said retainer 14 and handle 38 being integrally connected so as to form a rigid member. The retainer 14 is illustrated as provided with a plurality of faces 40 and 42 symmetrically formed about the axis of the member 14 which also includes a ball-shaped or rounded portion 44 corresponding generally in outline to the interior of the housing 10. The handle 38, as illustrated, is provided with a projection 46, the end of which is adapted to seat against the outside surface of the ball-shaped part 44 of the retainer 14. The ball-shaped portion 44 of the retainer 14 is provided with a pair of aligned threaded holes 48. A screw 50, countersunk in the handle 38 and extending through the projection 46, is provided for rigidly but removably securing the handle 38 to the retainer 14. A cavity 52 formed in the end of the retainer 14 is adapted to receive one end of a current conductor which extends through the hollow housing 10, and a set screw 54 threaded into one of the threaded holes 48 is provided for securing the end of the current conductor in the cavity and to the retainer 14, which is formed of metal.

The projection 46 of the handle 38 extends through an opening 56 provided in the housing 10, the opening 56 being sufficiently larger than the projection so as to permit the jaw member 36 as a whole to move relative to the housing 10. The ball-shaped portion 44 of the retainer 14 provides a surface which permits the retainer 14 to pivot directly on the inner surface of the housing 10. A spring 58 is confined between the exterior of the housing 10 and a pocket formed in the handle 38 and serves the purpose of biasing the retainer 14 toward the retainer 12, the jaw member 36 as a whole pivoting on the ball portion 44 thereof on the inner surface of the housing 10. The handle 38 preferably is formed of insulating material. In the position in which the parts are illustrated in Fig. 3, the working face 40 of the retainer 14 is in contact with the working face of the retainer 12, but in use an electrode (not shown), arranged in one of the grooves 24, 26, 28 or 30, will be clamped between the retainer 14 and the retainer 12. By moving the handle 38 against the pressure of the spring 58, the electrode clamped between the retainers 12 and 14 may be removed.

The retainer 14, as previously explained, is provided with a pair of working faces 40 and 42, although it will be appreciated that more may be provided if desired.

With this construction, when the working face 40 becomes unsuitable for use, the retainer 14 may, after the current conductor 41 and the handle 38 have been disconnected, be rotated 180° and then reassembled with the handle 38 and the current conductor so as to permit the use of the working face 42 in cooperation with the retainer 12. The threaded holes 48 are made of the same size so that the screw 50 and the set screw 54 will fit in both of the holes 48.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

We claim:

1. Welding electrode holder construction comprising a housing of insulating material having an electrode retaining part associated therewith, a pivotal jaw arranged at least partially within said housing, a portion of said jaw being constructed and arranged relative to the inner surface of said housing so as to provide a pivotal support for said jaw on the inner surface of said housing, said jaw forming an electrode retaining part which is cooperable with said electrode retaining part associated with said housing for retaining an electrode therebetween.

2. Welding electrode holder construction comprising a pair of jaws, at least one of which is formed of metal, each of said jaws being provided with at least one working face, and means for pivotally mounting said jaws relative to each other in such a manner that the working faces thereof will cooperate to retain an electrode therebetween, one end of said one of said jaws formed of metal being constructed in such a manner so as to have a plurality of working faces, another part of said last-mentioned jaw being readily detachable from said holder and embodying provisions for pivotally mounting such jaw so as to have any one of the working faces thereof arranged for cooperation with the working face of the other jaw for retaining an electrode therebetween, said retainer having a surface arranged to seat at least partially against an inside part of said housing and securing means for connecting said retainer to said housing, said securing means being non-conductive to an outside ground.

3. Welding electrode holder construction comprising a housing of insulating material having an electrode retaining face associated therewith, a pivoted jaw arranged at least partially within said housing, a portion of said jaw being constructed and arranged relative to the surface of said housing so as to provide a pivotal support for said jaw directly on a surface of said housing, said jaw being constructed in such a manner so as to have a plurality of electrode retaining faces, said jaw embodying provisions for mounting the same so as to have any one of the working faces thereof arranged for cooperation with the electrode retaining face associated with said housing for retaining an electrode therebetween.

4. Welding electrode holder construction comprising a housing of insulating material having an opening therein and provided with an electrode retaining face, a movable jaw member extending through said opening and having an electrode retaining face which is cooperable with said electrode retaining face associated with said housing for retaining an electrode therebetween, said member also including an insulated integral handle part disposed exteriorly of said housing, and a spring operatively disposed between a part of said housing and a part of said jaw member for biasing said electrode retaining faces toward each other, said jaw member having a ball-shaped portion formed thereon which cooperates with the inner wall of said housing to provide a pivotal support for said jaw member.

5. Welding electrode holder construction comprising a housing of insulating material having an opening therein and provided with an electrode retaining face, a jaw member extending through said opening and having an electrode retaining face which is cooperable with said electrode retaining face associated with said housing for retaining an electrode therebetween, said member also including an insulated integral handle part disposed exteriorly of said housing, and a spring operatively disposed exteriorly of said housing and between the same and said insulated handle part for biasing said electrode retaining faces toward each other, a portion of said jaw member being constructed and arranged relative to the surface of said housing so as to provide a pivotal support for said jaw directly on the surface of said housing.

6. Welding electrode holder construction comprising a tubular housing of insulating material having an electrode retainer of insulating material removably associated therewith, a pivoted metallic jaw associated with said housing, said jaw and said retainer each having a working face, means biasing said faces together for retaining an electrode therebetween, at least one of said faces being provided with a plurality of grooves therein for selectively holding an electrode at various angles, said removable retainer having a shoulder adapted to seat against the inside of said housing at one end thereof and having its outer surface flush with the outer surface of said housing, and means clamping said retainer to said housing.

7. Welding electrode holder construction comprising a housing of insulating material having an electrode retainer of insulating material removably associated therewith, a pivoted metallic jaw associated with said housing, said jaw and said retainer each having a working face, means biasing said faces together for retaining an electrode therebetween, at least one of said faces being provided with a plurality of grooves therein for selectively holding an electrode at various angles, said retainer having a surface arranged to seat at least partially against an inside part of said housing and securing means for connecting said retainer to said housing, said securing means being non-conductive to an outside ground.

8. Welding electrode holder construction comprising a tubular housing of insulating material, an electrode retaining face of insulating material removably secured to one end of said housing, a metallic jaw member arranged at least partially within said housing and cooperable with said face for retaining an electrode therebetween, a part of said jaw member being formed to provide a curved surface which cooperates with a curved surface of said housing to provide a pivotal support for said jaw directly on the surface of said housing, an insulated handle rigidly connected to said jaw and projecting from said housing through an opening therein, and a spring confined between said handle and an external part of said housing for biasing said jaw toward said electrode retaining face.

9. Welding electrode holder construction comprising a tubular housing having an electrode retaining face associated therewith, a metallic jaw member arranged at least partially within said housing, said jaw member being constructed in such a manner as to have a plurality of electrode retaining faces at one end thereof and having a cavity formed in the other end thereof, said cavity being adapted to receive an end of a current conductor, a plurality of threaded holes of the same size formed in said jaw member and communicating with said cavity, there being one threaded hole for each of said faces, a releasing handle projecting through an opening in said tubular housing, threaded means cooperating with said handle and engageable with one of said threaded holes for rigidly securing said handle to said jaw member, a set screw in another one of said threaded holes for securing said conductor to said jaw member, means for supporting said jaw member for movement relative to said housing, and means acting on said jaw member for biasing an electrode retaining face thereof toward the electrode retaining face associated with said housing.

10. Welding electrode holder construction comprising a tubular insulating housing having an opening in the side thereof and an electrode retaining face of insulating material associated with said housing adjacent one end thereof, an integral jaw member extending through said opening and having a movable electrode retaining face at least partially within said end of said housing and an insulated handle arranged alongside the exterior of the housing, a spring arranged between said housing and said handle for urging said electrode retaining faces toward each other, said jaw member being formed in such a manner that the handle thereof may be disconnected from the remaining part thereof, said jaw member being prevented from separation with said housing by that part of said jaw member which extends through said opening.

11. Welding electrode holder construction comprising an insulating housing having an electrode retainer of insulating material associated therewith, a pivoted metallic jaw associated with said housing, said jaw and said retainer each having a working face, means biasing said faces toward each other for securing an electrode therebetween, and a current conductor extending through said housing and being directly connected to said pivoted metallic jaw.

12. Welding electrode holder construction comprising a housing of insulating material having an electrode retaining part associated therewith, a pivotal jaw arranged at least partially within said housing, said jaw having a portion thereof constructed and arranged relative to a surface of said housing so as to provide a pivotal support for said jaw on said surface of said housing, said jaw forming an electrode retaining part which is cooperable with said electrode retaining part associated with said housing for retaining an electrode therebetween and means biasing said electrode retaining parts into engagement.

13. Welding electrode holder construction comprising clamping jaws arranged to retain an electrode between the working faces thereof, one of said jaws being formed at least in part of metal and having a source of current connected thereto, said jaw functioning to transmit current from said source to an electrode removably retained between the faces of said jaws, and means providing a pivotal connection between said jaws constructed and arranged so that it does not provide a current conducting path between said jaws.

14. Welding electrode holder construction comprising clamping jaws arranged to retain an electrode between the working faces thereof, one of said jaws being formed at least in part of metal and having a source of current connected thereto, said jaw functioning to transmit current from said source to an electrode removably retained between the faces of said jaws, and means providing a pivotal connection between said jaws constructed and arranged so that it does not provide a current conducting path between said jaws, the other clamping jaw terminating with a working face of insulating material.

15. Welding electrode holder construction comprising a tubular insulating housing having an opening in the side thereof and an electrode retaining face associated with said housing adjacent one end thereof, said electrode retaining face forming a jaw member, an integral jaw member extending through said opening and having an electrode retaining face at least partially within said end of said housing and an insulated handle arranged alongside the exterior of the housing, means providing a pivotal connection between said jaw members, a spring arranged between said housing and said handle for urging said electrode retaining faces toward each other, said integral jaw member being formed in such a manner that the handle thereof may be disconnected from the remaining part thereof, said jaw member being prevented from separation with said housing at least partly by that part of said jaw member which extends through said opening.

EDWARD BRAZITIS.
GEORGE BRAZITIS.

CERTIFICATE OF CORRECTION.

Patent No. 2,270,724. January 20, 1942.

EDWARD BRAZITIS, ET AL.

It is hereby certified that error appears in the printed specification of the above numbered patent requiring correction as follows: Page 2, second column, line 34, claim 2, beginning with the comma and words ", said retainer" strike out all to and including "ground" in line 39, and insert instead --and a handle removably secured to said jaw formed of metal which is provided with means for securing a current conductor directly thereto--; and that the said Letters Patent should be read with this correction therein that the same may conform to the record of the case in the Patent Office.

Signed and sealed this 17th day of March, A. D. 1942.

Henry Van Arsdale,
Acting Commissioner of Patents.

(Seal)